June 18, 1935.  B. O. GEPHART  2,005,081
FISHING ROD
Filed Sept. 8, 1934
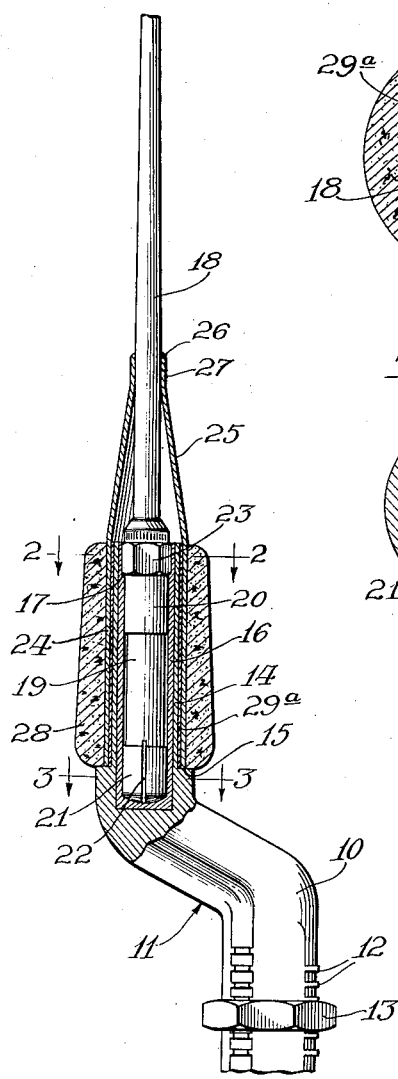
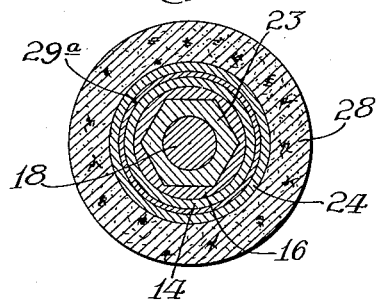
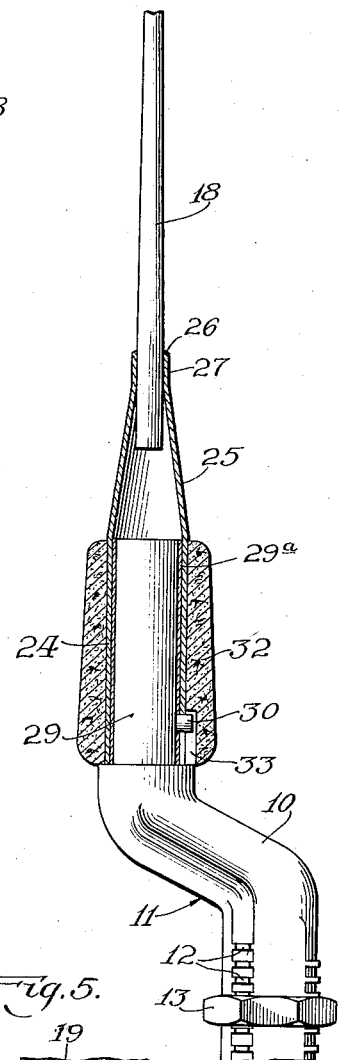
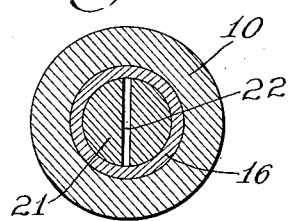
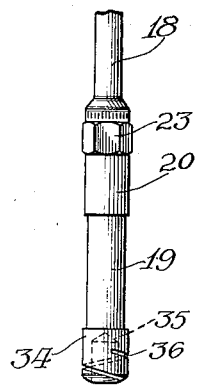
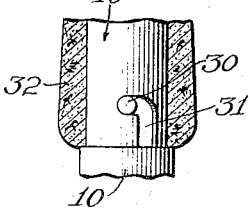
Inventor:
Bruce O. Gephart Patented June 18, 1935

2,005,081

UNITED STATES PATENT OFFICE 2,005,081

FISHING ROD

Bruce O. Gephart, Chicago, Ill.

Application September 8, 1934, Serial No. 743,228

7 Claims. (Cl. 43—23)

This invention relates in general to fishing rods, but more specifically to the manner of constructing and assembling certain parts thereof.

It is well known that with rods where one end is removably telescoped into the handle, and where they are releasably held by friction, or otherwise, considerable difficulty is sometimes experienced in separating these parts, owing to the fact that they will stick, with the result that in attempting to detach the rod from the handle, the hand of the operator will frequently slip and become cut or otherwise damaged by contacting the line guide eyes or loops. It is one of the objects of the present invention to overcome these difficulties and objections, and to provide improved means such as a shield, ferrule, or skirt which is secured to the rod, and which telescopes over one end of the handle to form or constitute a substantial hand grip for use in detaching the rod from the handle, and which ferrule, by reason of its telescoping over the end of the handle, will form or constitute an additional friction surface on the outside of the handle and at the joint between the handle and rod, and will also serve to brace or reinforce the joint.

A further object is to provide an improved sleeve, ferrule or skirt of this character which will constitute a shield for preventing water or foreign particles from entering or damaging the telescoping joint between the rod and handle.

In constructions where one end of the rod telescopes into the handle there is, in addition to the frictional contact between the telescoping parts, a certain degree of vacuum which co-operates with the fractional binding, to assist in preventing a too ready separation of the parts under normal conditions. It is another object of the present invention to provide improved means for increasing this vacuum, so as to more securely hold the parts together, to prevent the rod from becoming too readily separated.

A further object is to provide improved means for preventing rotation of the rod with respect to the handle.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a view partly in longitudinal section, partly broken away, and with parts omitted, of a fishing rod of this character constructed in accordance with the principles of this invention.

Figure 2 is a detail sectional view taken on line 2—2, Figure 1, on an enlarged scale.

Figure 3 is a detail sectional view taken on line 3—3, Figure 1, on an enlarged scale.

Figure 4 is a view similar to Figure 1 of another form of the invention.

Figure 5 is an enlarged detail view, partly in elevation, partly in section and with parts broken away, of a form of locking means.

Figure 6 is a detail view in elevation of a modified form of one end of the rod section.

Figure 7 is a lower end elevation of Figure 6.

Referring more particularly to the drawing, the numeral 10 designates generally the handle of a fishing rod having an offset or recessed portion 11, provided with threads 12 on which a nut 13 is threaded for securing the fishing reel to the handle, but these parts are of the ordinary and well known construction.

The end 14 of the handle is reduced exteriorly to any desired extent to form a circumferential shoulder 15, and if desired, there may be provided a tubular lining 16 within the end 14 of the handle. A portion of the lining is enlarged in diameter to form a circumferential shoulder 17, and the portion of the lining 16 adjacent the shoulder 17 is angular in cross section, here shown as being hexagonal, but it is to be understood that any other shape may be provided, for a purpose to be set forth.

The numeral 18 designates one of the fishing rod sections and secured to the end of the rod is an extension 19, preferably reduced at points intermediate its ends to form portions 20—21 which are of a diameter only slightly less than the internal diameter of the lining 16 so as to form frictional contact with the wall of the liner. The extremity of the extension is preferably provided with a kerf 22 so as to impart resiliency or elasticity to the extremity of the extension and thereby increase the frictional contact between the periphery of the portion 21 and the wall of the liner. If this frictional contact is desired to be increased, it is only necessary to spread the sections of the portion 21 by inserting an instrument into the kerf 22.

The upper end of the extension is preferably provided with a portion 23, here shown as being of a hexagonal configuration, but this portion is of a shape or contour to conform to the portion of the liner above the shoulder 17, and these two parts co-operate to lock or secure the handle 10 and the rod 18 against relative rotation.

The numeral 24 designates generally a ferrule, apron or skirt of tubular configuration open at the bottom and provided with a tapered portion 25 at the top, and this tapered portion gradually decreases in internal diameter to the extremity 26 thereof, and adjacent such extremity is a cylindrical portion 27 of substantial length so as to fit and closely hug the rod 18. The ferrule is secured to the rod section 18 in any suitable manner, such as by means of solder, brazing or in any other manner suitable for the purpose, and the internal diameter of the body portion of the ferrule is slightly greater than the external diameter of the reduced portion 14 of the handle 10 and also considerably greater than the external diameter of the extension 19 on the rod 18.

With this construction it will be manifest that when the rod section 18 is detached from the handle, the ferrule 20 will be secured to the rod and will be spaced from and encompass the extension 19, so that when it is desired to secure the rod section 18 to the handle 10, the extension 19 is telescoped into the handle by passing into the lining 16 until the portion 23 is seated in the corresponding portion at the upper end of the handle. The ferrule 24 will be telescoped over the end 14 of the handle to abut the shoulder 15 and by reason of this construction, there will be exerted a frictional contact between the extension 19 on the rod within the handle and also a frictional contact will be exerted upon the outside of the reduced portion 14 of the handle, thereby materially increasing the friction and rendering the parts more difficult to separate.

The numeral 28 designates a hand grip, here shown as constructed of cork or similar material, which is sleeved upon the end of the ferrule 24 and is secured to the ferrule. This grip 28 is adapted to be grasped by the operator when it is desired to detach the rod from the handle.

In rods of this character it sometimes happens that the end of the rod which is telescoped into the handle frequently sticks, and it is difficult to separate the parts. The user generally grasps the end of the rod in one hand and the handle in the other and exerts a stress upon the rod to remove the same, but frequently, owing to the fact that the parts are difficult to separate, the hand of the operator slips lengthwise of the rod and contacts with the line guides or eyes, with the result that the hand will be injured.

With this form of the invention it will be manifest that the ferrule 24 with its extension 25 forms a shield or guard, and this, together with the grip 28 provides a means whereby the operator may grasp the grip and remove the rod from the handle without danger of the hand slipping.

At the same time the ferrule 24 with its extension 25 serves as a means to reinforce the joint and further provides a protecting means to prevent water and foreign particles entering the joint between the rod and the handle.

In the form of the invention shown in Figure 4 the end of the rod 18 is telescoped into the extremity 26 of the tapered portion 25 of the ferrule 24 for any desired distance, and the two are secured together by solder, brazing, or in any other suitable manner.

In this form of the invention the reduced portion 29 of the handle 10 is provided with a laterally projecting lug 30 which is adapted to enter a bayonet slot 31 in the ferrule 24 so as to lock the ferrule to the handle 10, when the ferrule is telescoped over the reduced portion 29 of the handle.

A grip 32 of any suitable material is sleeved over and fastened to the cylindrical portion of the ferrule, and this grip may be constructed of any suitable material, such as cork or the like, and is provided with a recessed or cut away portion 33 so as to permit the lug or projection 30 to enter the bayonet slot.

In the form of the invention shown in Figure 6, the lower portion 34 of the extension 19 on the rod 18 is bored out through one end as at 35 and the walls of the bored out portion are provided with a kerf 36 preferably of a spiral configuration to form what might be termed a coiled spring portion at the extremity of the extension 19, so that when it is desired to increase the friction between the end of the extension 19 and the wall of the lining of the handle 10, the diameter of the spring portion formed by the kerf 36 may be increased by inserting a tool or implement into the open end of the extension 19 and thereby spreading such end of the extension.

If desired a bushing 29ª, of any suitable material may be provided between the reduced end of the handle and the telescoping end of the sleeve or ferrule to insure a better joint.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A guard ferrule for fishing rods in which the rod is detachably secured to the handle, said ferrule telescoping with the end of the handle and extending beyond the extremity of the handle for a substantial distance and secured to the rod at a point remote from said extremity, said ferrule being detachable from the handle with the rod section, and interlocking means between the ferrule and the handle for releasably securing them together.

2. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, and means for maintaining the rod, ferrule and handle against relative rotation, the area of the outer surface of the ferrule extending beyond the handle being sufficient to enable the operator to apply a grip thereon by two or more fingers while the remainder of his fingers surrounds the portion of the ferrule mounted on the handle.

3. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, and a weld forming a permanent securing means between one end of the ferrule and the rod, the area of the outer surface of the ferrule extending beyond the handle being sufficient to enable the operator to apply a grip thereon by two or more fingers while the remainder of his fingers surrounds the portion of the ferrule mounted on the handle.

4. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, means for maintaining the rod, ferrule and handle against relative rotation, the area of the outer surface of the ferrule extending beyond the handle being sufficient to enable the operator to apply a grip thereon by two or more fingers while the remainder of his fingers surrounds the portion of the ferrule mounted on the handle, and a flexible waterproof element permanently secured to the ferrule and adapted to be gripped by a portion of the hand of the operator during the normal operation of removing the rod and ferrule from the handle.

5. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, means for maintaining the rod, ferrule and handle against relative rotation, the area of the outer surface of the ferrule extending beyond the handle being sufficient to enable the operator to apply a grip thereon by two or more fingers while the remainder of his fingers surrounds the portion of the ferrule mounted on the handle, and a gripping element permanently secured to the ferrule and adapted to be disassembled therewith during a normal operation of removing the rod from the handle, said gripping element abutting at one end thereof a shoulder on the handle in the assembled position of the rod on the handle.

6. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, means for maintaining the rod, ferrule and handle against relative rotation, the area of the outer surface of the ferrule extending beyond the handle being sufficient to enable the operator to apply a grip thereon by two or more fingers while the remainder of his fingers surrounds the portion of the ferrule mounted on the handle, and a gripping element permanently secured to the ferrule and adapted to be disassembled therewith during a normal operation of removing the rod from the handle, said gripping element abutting at one end thereof a shoulder on the handle in the assembled position of the rod on the handle, said handle at its rod end being hollow and having an external diameter less than the internal diameter of the ferrule at the part thereof which is removably secured to the ferrule, and an internal diameter greater than the external diameter of the rod.

7. A fishing rod embodying a rod section, a separate handle to which one end of the rod is adapted to be detachably secured, a ferrule, one end of which is adapted to telescope with one end of the handle, the other end of the ferrule extending for a substantial distance beyond the extremity of the handle when in assembled position and encompassing the rod, the extremity of the last said end of the ferrule being permanently secured to the rod, whereby in a normal operation of removing the rod from the handle, the ferrule will always be removed from the handle with the rod and will always remain a permanent attachment to the rod, means for maintaining the rod, ferrule and handle against relative rotation, the area of the outer surface of the ferrule extending beyond the handle being sufficient to enable the operator to apply a grip thereon by two or more fingers while the remainder of his fingers surrounds the portion of the ferrule mounted on the handle, and a gripping element permanently secured to the ferrule and adapted to be disassembled therewith during a normal operation of removing the rod from the handle, said gripping element abutting at one end thereof a shoulder on the handle in the assembled position of the rod on the handle, said handle at its rod end being hollow and having an external diameter less than the internal diameter of the ferrule at the part thereof which is removably secured to the ferrule, and an internal diameter greater than the external diameter of the rod, said ferrule tapering gradually from the handle towards its permanent connection to the rod and having a maximum external diameter corresponding to the internal diameter of the gripping element.

BRUCE O. GEPHART.